United States Patent [19]

Stevens et al.

[11] Patent Number: 5,063,180

[45] Date of Patent: Nov. 5, 1991

[54] LOW SILICA CERAMIC FIBER

[75] Inventors: Robert B. Stevens, Mexico; Orville Hunter, Jr., Columbia, both of Mo.

[73] Assignee: A. P. Green Industries, Inc., Mexico, Mo.

[21] Appl. No.: 553,722

[22] Filed: Jul. 16, 1990

[51] Int. Cl.[5] .................. C03C 13/02; C03C 13/00; C03C 3/062
[52] U.S. Cl. .................................... 501/38; 501/73
[58] Field of Search .......................... 501/38, 35, 73

[56] References Cited

U.S. PATENT DOCUMENTS

| | | | |
|---|---|---|---|
| 2,873,197 | 2/1959 | McMullen | 501/38 |
| 3,069,773 | 12/1962 | Saffir | 501/38 |
| 3,904,424 | 9/1975 | Aoki et al. | 501/38 |
| 4,055,434, | 4/1976 | Bennett et al. | 501/35 |
| 4,555,492 | 11/1985 | Ekdahl et al. | 501/38 |
| 4,558,015 | 12/1985 | Ekdahl et al. | 501/38 |

Primary Examiner—Mark L. Bell
Attorney, Agent, or Firm—Senniger, Powers, Leavitt & Roedel

[57] ABSTRACT

Low silica ceramic fiber compositions comprising from 46–49% alumina, 23–25% silica and 27–29% zirconia.

2 Claims, 3 Drawing Sheets

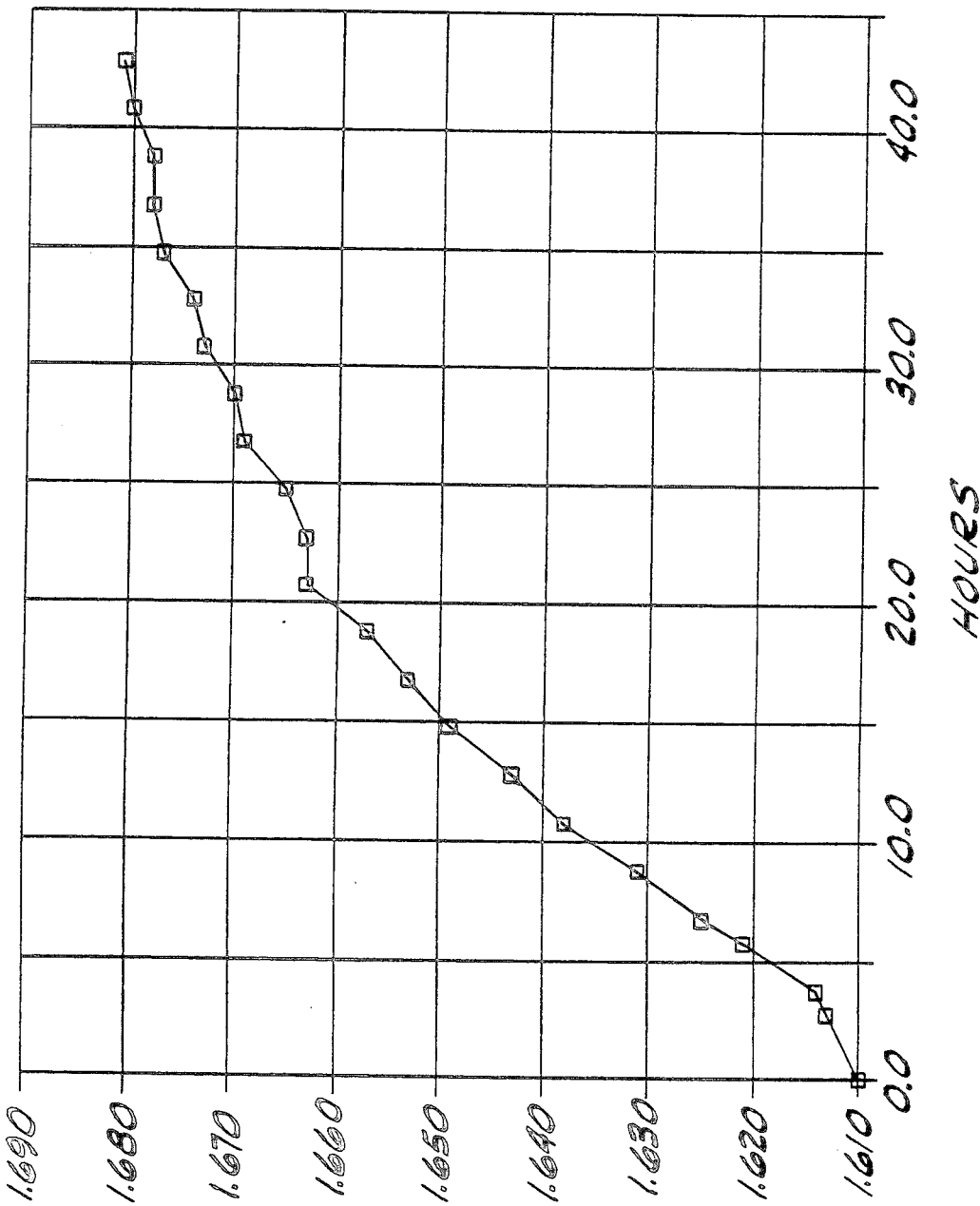

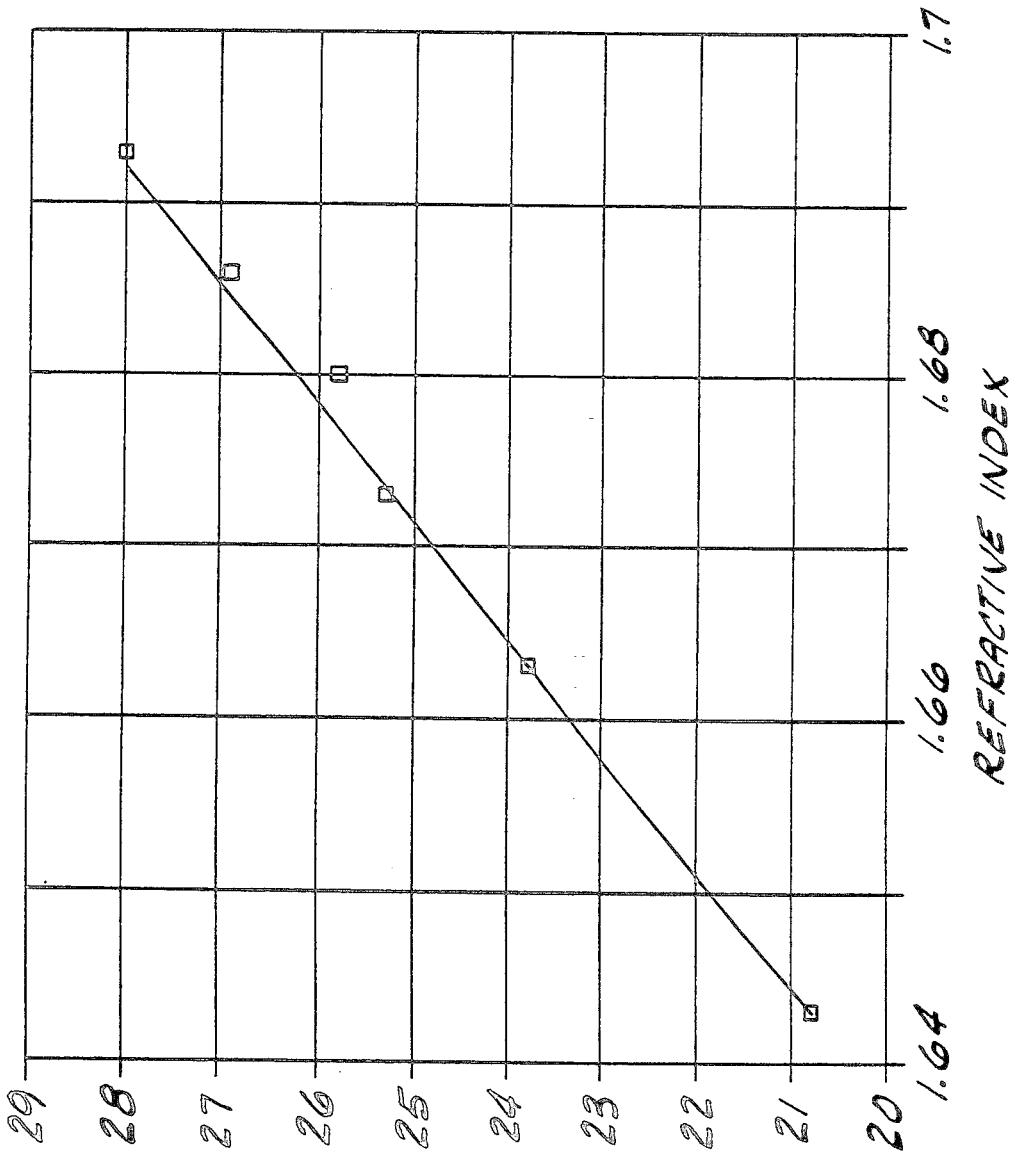

LOW SILICA CERAMIC FIBER

BACKGROUND OF THE INVENTION

This invention relates to refractory fiber compositions useful in forming fibrous thermal insulation for the reduction of heat loss behind brick lined furnaces, or as a primary lining in reheat furnaces where relatively low gas velocities are encountered or contact with molten slag does not occur.

Ceramic fibers of silica ($SiO_2$) alumina ($Al_2O_3$) and zirconia ($ZrO_2$) having sufficient refractoriness to retain their strength and resilience at temperatures of 2000°–2400° F. are known and have been used commercially to provide thermal insulating materials. These refractory fiber materials can be produced by the blowing method, i.e. impinging a high velocity stream of gas against a falling stream of molten inorganic composition, but are more typically produced by the spinning method. In the latter method a molten stream of inorganic material is released onto either a side or the periphery of one or more rapidly rotating cylinders which throw the molten material off in a tangential direction thereby fiberizing it.

Regardless of the method used to form the ceramic fibers the fibers as formed are in the glass state, i.e. they are amorphous or non-crystalline. The formation of thermal blankets and other products from these fibers does not affect the state of the fiber. As the prior art fibers are heated over time, for example when used in the form of a blanket for a furnace lining, the silicate mineral mullite ($3Al_2O_3 \cdot 2SiO_2$) is formed at temperatures above 1700° F. At temperatures above about 2200° F. the mineral cristobalite ($SiO_2$) forms. Recently, a concern has arisen that cristobalite is a human carcinogen and therefore efforts have been made to eliminate it from the workplace.

SUMMARY OF THE INVENTION

Accordingly, it is an object of the present invention to provide ceramic fiber compositions suitable for producing refractory fibers which form little (<1%) or no detectable amount of cristobalite on heating to temperatures at which that mineral would be expected to form. An additional object is to provide such ceramic fiber compositions suitable for continuous use at temperatures up to at least about 2250° F. and intermittent use at temperatures up to at least about 2400° F. which have good tensile strengths and exhibit very low linear shrinkage.

A further object of the invention is to provide ceramic fiber compositions comprised of alumina, silica and zirconia which contain relatively low amounts of silica. More particularly, the present invention is directed to low silica ceramic fiber compositions comprising from 46–49% alumina, 23–25% silica and 27–29% zirconia.

These and other objects which will become apparent from the detailed description of the invention which follow.

BRIEF DESCRIPTION OF THE DRAWINGS

FIG. 2 shows the change in refractive index versus time during the transition to compositions of the invention.

FIG. 3 shows the relationship between refractive index and the $ZrO_2$ content during the transition to compositions of the invention.

DETAILED DESCRIPTION OF THE INVENTION

Figure 1:
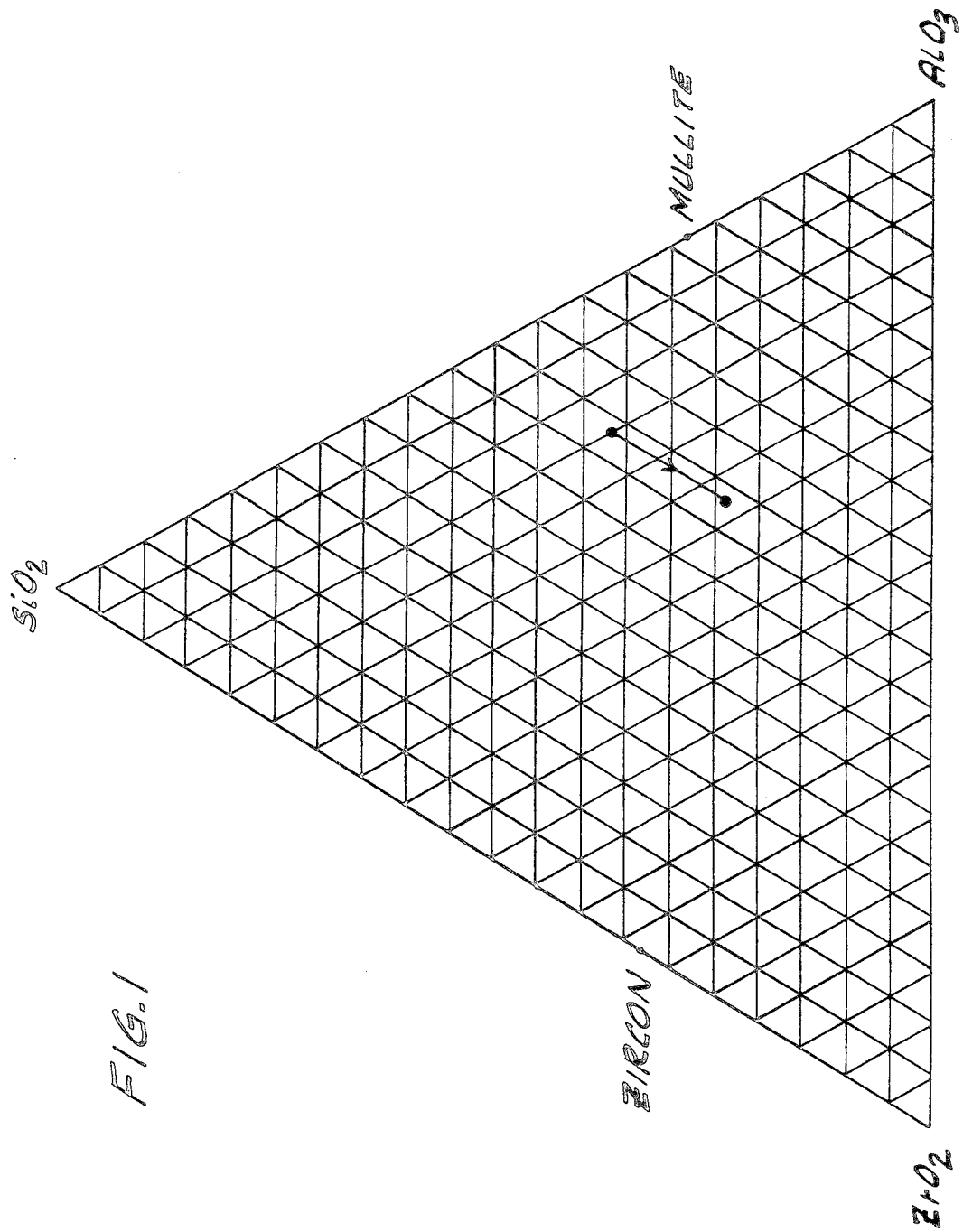
FIG. 1 shows a transition pathway for the production of compositions of the invention from prior art compositions.

The fiber compositions of the invention, due to their low silica and high zirconia content, are difficult to prepare directly in an electric furnace which is the usual type of furnace employed in the industry for preparing melts of such compositions. Accordingly, an initial composition of higher silica and lower zirconia content than the instant compositions which is more easily melted than compositions of the invention is first melted. Thereafter, a series of compositions are added to the melt wherein each successive addition is of lower silica and higher zirconia content than the previously added composition. Through this practice of transitioning from an initial easily meltable composition to a composition of the invention a melt of a composition of the invention is obtained. The preparation of a fiber composition of the invention following a typical transition pathway, as illustrated in FIG. 1, is detailed in Example 1.

EXAMPLE 1

An initial composition of 47% $Al_2O_3$, 38% $SiO_2$, and 15% $ZrO_2$ was prepared by charging to an electric furnace 1785 pounds of alumina, 1123 pounds of silica and 890 pounds of zircon sand [zirconium silicate ($ZrO_2 \cdot SiO_2$)]. The charge was melted and fiber was produced by discharging the melt onto rotating cylinders. As material was withdrawn it was replaced in the furnace with series of dry compositons (transition compositions) until the desired chemical composition was achieved. Elapsed time for complete transition to a composition of the invention was about 40 hours. The chemical analysis of the compositions charged to the furnace and the amounts charged during this period are set forth in Table I below.

TABLE I

|  |  | Initial | 1 | 2 | 3 |
|---|---|---|---|---|---|
| Chemical | $Al_2O_3$ | 47 | 48 | 48 | 48 |
| Analysis- | $SiO_2$ | 38 | 32 | 27 | 24 |
| percent | $ZrO_2$ | 15 | 20 | 25 | 28 |
| by weight |  |  |  |  |  |
| Amount | $Al_2O_3$ | 1785 | 1823 | 1824 | 1439 |
| Charged- | $SiO_2$ | 1123 | 788 | 492 | 247 |
| pounds | Zircon Sand | 890 | 1187 | 1484 | 1312 |

During this period of additions/charges the changes in the chemical analysis of the fiber due to changes in the compositions of the transition charges and the preparation of fibers of the invention were observed by measuring the refractive index of samples of fiber. Since the fibers are glasses (isotropic substances) they will have only one refractive index which can be measured by the oil immersion method using microscopic immersion oils in the refractive index range of 1.450–1.700 (0.004 intervals are required). Immersion oils which were used are available from R. P. Cargille Laboratories, Inc. of Cedar Grove, N.J. In this method a very small amount of the fiber sample is removed from a larger sample. A fiber sample of 1×3 mm. is sufficient.

The fiber sample and a drop or two of immersion oil are placed upon a clean microscope slide. The slide is placed under a microscope fitted with an orange filter over the light source (Cargille oils are calibrated for orange-yellow light). The relative difference between the refractive index of the fiber and of a series of oils is then determined by observing the movement of the Becke line at the edge of the fiber. Generally, an oil having a refractive index lower than that of the fiber is used first causing the Becke line to move into the fiber. This process is repeated until the Becke line moves away from the fiber or shot indicating that the chosen immersion oil has a higher refractive index than the fiber or shot. Therefore, the refractive index of the fiber or shot must have a value somewhere between the last two oils used. The results of analyzing samples of fiber using the aforedescribed procedure for fiber produced during the test period are plotted in FIG. 2 which is a plot of refractive index versus time.

Chemical analysis of fiber samples was also carried out during the test period. The results of those analyses are set forth in Table II. Samples 5 and 6 represent compositions of the invention.

TABLE II

| Sample No. | 1 | 2 | 3 | 4 | 5 | 6 |
|---|---|---|---|---|---|---|
| $Al_2O_3$ | 47.2 | 47.5 | 48.1 | 48.2 | 48.7 | 49.2 |
| $SiO_2$ | 32.0 | 28.7 | 26.7 | 25.5 | 23.3 | 23.9 |
| $ZrO_2$ | 20.8 | 23.8 | 25.3 | 25.8 | 28.0 | 26.9 |

Since $ZrO_2$ content was also measured refractive index can be plotted versus zirconium content to provide a convenient way to track the transition to a composition of the invention. Such a plot is provided in FIG. 3.

Blankets of fibers of the invention were prepared by first impinging the exit stream from the furnace on a pair of spinning stainless steel cylinders, 10 inches in diameter, rotating at 7400-7800 rpm. This produces fibers which are generally 1-10 microns in diameter (average diameter of 2-4 microns). Bulk fiber was then needled into a blanket. The needling is done parallel to the length of the blanket (i.e. machine direction) providing greater tensile strength in that direction than across the blanket. The density, tensile strength and shot content were determined for blankets from fibers produced during the test about one and two days after the introduction of the final or end batch composition had begun to be introduced into the furnace. These properties were as follows:

TABLE III

| Day No. | Density, pcf | Tensile, psi | | Shot Content, % | |
|---|---|---|---|---|---|
| | | Mach. Dir. | Cross Dir. | Blanket | Edge |
| 1 | 8.6 | 15.0 | 8.9 | 52.0 | 66.0 |
| 2 | 8.2 | 15.4 | 9.3 | 45.0 | 57.0 |

The linear shrinkage of blankets made from fibers whose chemical analysis is present above (transition to desired product) was also initially determined. For these initial tests shrinkage was measured after a 100 hour soak at 2250° F. and at 2400° F. These test conditions were selected in order to provide an indication of the maximum linear shrinkage. The shrinkage of fiber sample No. 1 was not determined. The results are shown in Table IV.

TABLE IV

| | Linear Shrinkage, % | |
|---|---|---|
| Spl. No. | 2250° F. | 2400° F. |
| 2 | 2.18 | 3.12 |
| 3 | 1.84 | 2.30 |
| 4 | 1.86 | 1.86 |
| 5 | 1.93 | 2.14 |
| 6 | 1.92 | 2.31 |

The mineralogical composition of linear shrinkage samples 2-6 was also determined by x-ray diffraction analysis. The results of those tests is set forth in Tables V and VI (2250° F. and 2400° F., respectively).

TABLE V

| Spl. No. | (2250° F.) |
|---|---|
| 2 | mullite, Major; cubic zirconia, Major; cristobalite, Trace; monoclinic zirconia, Trace; zircon, Trace. |
| 3 | mullite, Major; cubic zirconia, Major; cristobalite, Trace; possible monoclinic zirconia, Trace; zircon, Trace. |
| 4 | mullite, Major; cubic zirconia, Major; cristobalite, Trace; zircon, Trace. |
| 5 | mullite, Major; cubic zirconia, Major; monoclinic zirconia, Trace; cristobalite, <1%; zircon, Trace. |

TABLE VI

| Spl. No. | (2400° F.) |
|---|---|
| 5 | mullite, Major; cubic zirconia, Major; cristobalite, <0.5%; monoclinic zirconia, Trace +; zircon, Trace +. |

From these tests on a commercial scale it is evident that although the refractive index procedure is reasonably useful in predicting the composition of the wool and blanket during the transition, chemical analysis of the products was necessary to insure that the desired material is being produced, especially at the end of the transition where there was a lack of experimental data. However, once additional experience is gained, use of the refractive index will provide a reliable tool for operating a furnace. It is evident that the desired composition was reached by comparing the mix target data (Table I) with the chemical analysis data (Table II).

The tensile strength and shot content of the blanket prepared from the desired minimum cristobalite-forming fibers are in the same range as present commercial products having higher silica content which form higher cristobalite-content products.

The linear shrinkages upon firing were lower than many present commercial products and were unexpected. It would be expected that linear shrinkage tests in an electric furnace following ISO/TC procedure 33/SC2 (1989 revision) for the "Determination of the Permenant Linear Change on Testing" under "Methods for Testing Insulating Products Made from Ceramic Fibers" would be approximately the same. That expectation is supported by the shrinkages measured by the ISO/TC procedure which ranged from 2.8% to 3.1% in the temperature range of 2000-2700° F. The measured values are set forth in Table VII.

TABLE VII

| Temperature, °F. | Linear Shrinkage, % - ISO/TC |
|---|---|
| 2000 | 2.8 |

TABLE VII-continued

| Temperature, °F. | Linear Shrinkage, % - ISO/TC |
| --- | --- |
| 2250 | 2.9 |
| 2400 | 3.0 |
| 2500 | 3.1 |
| 2700 | 3.1 |

The mineralogical analyses of the transition blankets and final product showed much lower amounts of cristobalite, after firing, than many commercial products. Specifically, the desired product showed no detectable cristobalite after 100 hours which provides a good measure of the maximum amount of cristobalite that will form at a given service temperature in commercial applications. It would be expected, therefore, that a trace amount of cristobalite (0.5–1%) would be found after firing at 2250° F. and no detectable cristobalite (by x-ray diffraction analysis) would be evident in blankets fired at 2400° F. after 100, or more, hours of service.

The foregoing description of the embodiments of the invention is not intended as limiting of the invention. As will be apparent to those skilled in the art variations and modifications of the invention may be made without departure from the spirit and scope of this invention.

What is claimed is:

1. A refractory glass fiber, said fiber in bulk or blanket form being substantially cristobalite-free when subjected to temperatures of up to about 2700° F., consisting of, by weight percent:

$AL_2O_3$ 46–49
$SiO_2$ 23–25
$ZrO_2$ 27–29.

2. A refractory fiber body comprised of a plurality of fibers of the composition of claim 1.

* * * * *